United States Patent

[11] 3,587,323

| [72] | Inventors | Morris A. Benjaminson<br>New York City;<br>Nicholas M. Satriano, Rego Park; Irwin J. Katz, Brooklyn, N.Y. |
|---|---|---|
| [21] | Appl. No. | 850,738 |
| [22] | Filed | Aug. 18, 1969 |
| [45] | Patented | June 28, 1971 |

[54] WIND DIRECTIONAL AIR SAMPLING DEVICE
1 Claim, 1 Drawing Fig.

[52] U.S. Cl. .................................................. 73/421.5
[51] Int. Cl. .................................................. G01n 1/22
[50] Field of Search ...................................... 73/421.5, 28, 170, 422

[56] References Cited
UNITED STATES PATENTS
3,261,199  7/1966  Raynor ....................... 73/421.5X
3,353,411  11/1967  Nadeau et al. ............... 73/421.5

Primary Examiner—Louis R. Prince
Assistant Examiner—William A. Henry, II
Attorneys—Louis A. Miller, Louis B. Applebaum and Arthur L. Bowers ABSTRACT: An air-sampling device particularly useful in a ship for collecting aerosol or airborne solid particles which includes a bearing-supported aerovane controlled wide-mouth collection aperture of a tubing elbow oriented continuously into the wind and directing the airstream intercepted thereby to pneumatic conduit terminating in a chamber having lateral air exhausts and a removable specimen collection dish in the path of the air issuing from the conduit.

The invention described herein may be manufactured and used by or for the Government of the United States of America for governmental purposes without the payment of any royalties thereon or therefor.

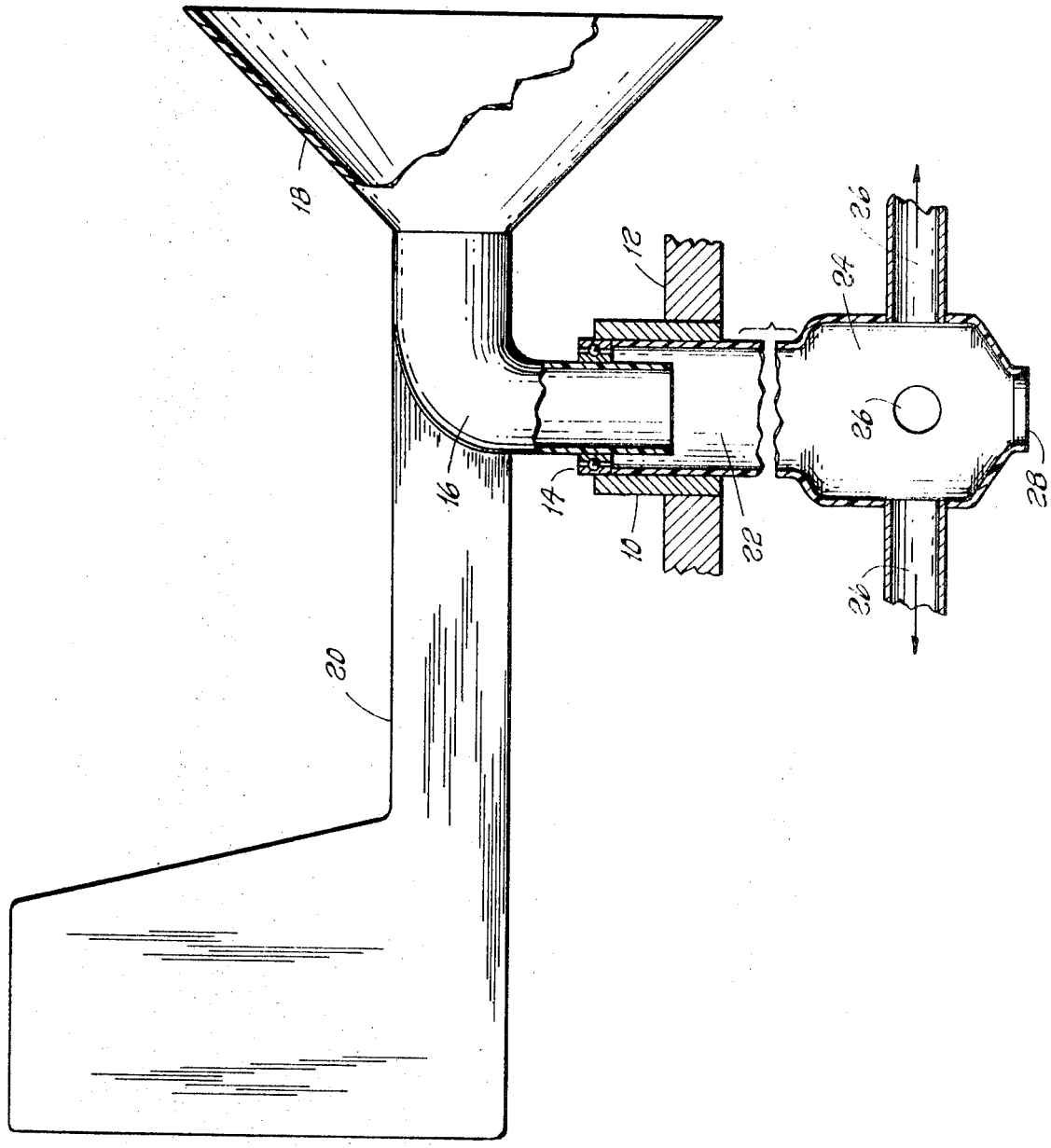
PATENTED JUN28 1971   3,587,323
INVENTORS.
MORRIS A. BENJAMINSON
NICHOLAS M. SATRIANO
IRWIN J. KATZ
BY
ATTORNEY

WIND DIRECTIONAL AIR SAMPLING DEVICE

BACKGROUND OF THE INVENTION

Through accident or intent, solid particles or aerosols hazardous to human or other forms of life may be released into the atmosphere. Such particulate material may be carried for long distances by wind before falling to earth. Detection monitors for such materials are required for stationary locations on land, for vehicles specially equipped for such monitoring and for ships, particularly Naval or Coast Guard vessels. The simplest form of particle collector is the open dish, but it is not satisfactory under wind conditions. More sophisticated air sampling devices have been equipped with a fixed unidirectional structure for collecting particles arriving from a specific direction. When the wind direction is other than the direction to which the stationary device is oriented, no particles are collected.

SUMMARY OF THE INVENTION

This invention relates to an aerosol or particle-collecting device of general utility, but especially useful on ships, that continuously orients a collection aperture into the wind and directs the airstream sample through a gauge filter, a particle collection dish, or a trap i.e.: U-shaped tubing containing a fluid and aided by a pressure-reducing exhaust fan arrangement at the other end of the tubing. Preferably, the device is constructed of Teflon or any other material that does not release any contaminating particles into the sample and is not subject to corrosion attack by air and salt water.

The single FIG. is a simplified showing, partly in section, of an embodiment of the invention.

The disclosed embodiment includes a bearing support 10 which is affixed to an exposed upper structure 12 of a ship, not shown, or to any other support which may be stationary or which may be part of a vehicle. A bearing 14 is mounted in the upper portion of the bearing support 10. A tubular element 16 is supported for rotation by the bearing. At its lower end, tubular element 16 extends through the bearing and terminates open-ended a short distance below the bearing. The tubular member 16 has a right-angle bend above the bearing and flares to a cone-shape wide-mouth termination 18. An aerovane 20 is secured to the tubular member 16 and extends oppositely to the flared end and operates continuously to direct the wide-mouthed end of the tubular element into the wind. The upper end of a pneumatic conduit 22 is secured in the bearing support and surrounds the depending end of the tubular member 16. The bottom end of the conduit terminates in a chamber 24 provided with several air exhaust elements 26. The chamber narrows at the bottom and supports a removable specimen collection dish 28. A substantial percentage of the particles carried into the chamber tend to continue on to the dish 28 as the air delivered by the conduit exhausts laterally from the chamber. An inert durable synthetic material such as Teflon is preferred for the structure.

We claim:

1. An airborne particulate-sampling device comprising:

a chamber having a sample collection dish at the bottom and lateral air exhausts, a bearing support, conduit means joined to the upper end of the chamber and extending upward from the chamber into the bearing support, a bearing carried by the bearing support, a tubular element rotatably supported in the bearing and bent at right angles above the bearing and terminating in a flared end, and an aerovane joined to the tubular element for directing the flared end of the tubular element into the wind.